United States Patent [19]

Hattori et al.

[11] 4,440,014
[45] Apr. 3, 1984

[54] KNOCKING DETECTION DEVICE

[75] Inventors: Tadashi Hattori, Okazaki; Tadashi Ozaki, Gamagori; Yoshinori Ootsuka; Kazuhiko Miura, both of Okazaki; Masanori Hanaoka; Yukihide Hashiguchi, both of Toyota, all of Japan

[73] Assignees: Nippon Soken, Inc., Nishio; Toyota Jidosha Kogyo Kabushiki Kaisha, Toyota, both of Japan

[21] Appl. No.: 368,090

[22] Filed: Apr. 13, 1982

[51] Int. Cl.³ ............................................. G01L 23/22
[52] U.S. Cl. ........................................ 73/35; 73/714; 92/103 M
[58] Field of Search ................... 73/35, 702, 706, 714, 73/715; 92/103 R, 103 M, 103 SD

[56] References Cited

U.S. PATENT DOCUMENTS 2,230,273  2/1941  Smith ........................... 92/103 M X
4,299,117  11/1981  Andrews et al. ....................... 73/35

Primary Examiner—James J. Gill
Attorney, Agent, or Firm—Cushman, Darby & Cushman

[57] ABSTRACT

An engine knocking detection device has a diaphragm to be disposed in contact with the engine cooling water so as to resonate with pulsations of the pressure of the cooling water caused by engine knockings, and output elements responsive to the vibration of the diaphragm to produce an electrical output signal to be utilized for the control of engine spark timing. The water-contacting surface of the diaphragm is coated with a layer of a hydrophilic material operative to prevent attachment or adhesion of air bubbles to the water-contacting surface of the diaphragm whereby the sensitivity of the diaphragm to the water pressure pulsation is improved.

4 Claims, 4 Drawing Figures ial surface of the yoke 206, and the annular groove 206a has received therein a piezoelectric element 207 which is in the form of a ring and has an outer peripheral portion connected to the inner peripheral edge of the annular magnetic member 205.

KNOCKING DETECTION DEVICE

BACKGROUND OF THE INVENTION

1. Field of the Invention

The present invention relates to a device for detecting knockings generated in an internal combustion engine to produce an electrical output which can be fed, for example, into an engine spark timing control system to optimize the engine spark timing. More particularly, the invention is concerned with an engine knocking detection device of the type which is provided with a diaphragm exposed to the engine cooling water so that the diaphragm resonates with high frequency pulsations of the water pressure which are caused by vibrations of engine cylinders which in turn are generated by engine knockings which occasionally take place in engine cylinders.

2. Description of the Prior Art

With the knocking detection device of the type specified above, air bubbles tend to be adhered or attached to the surface of the diaphragm exposed to the engine cooling water. Since air bubbles are compressible, the pulsations of the engine cooling water pressure caused by engine knockings are inconveniently absorbed by the air bubbles, so that the amplitude of the vibration of the diaphragm is reduced to undesirably lower the output voltage of the knocking detection device. This tendency is remarkably increased especially when the engine knocks at a high frequency range. It is also experienced that, with certain diameters of air bubbles, a diaphragm which provides a generally flat frequency characteristic before the attachment of the air bubbles thereto exhibits a resonance after the attachment of the air bubbles.

SUMMARY OF THE INVENTION

It is an object of the present invention to provide an improved knocking detection device of the type specified above and in which the diaphragm is guarded against the attachment of air bubbles to eliminate the problem and shortcoming discussed above.

The knocking detection device according to the present invention includes a diaphragm having one surface adapted to be faced to the engine cooling water and being operative to vibrate in response to pulsation of the pressure of the water caused by an engine knocking. The knocking detection device also includes means responsive to the vibration of the diaphragm to produce an electrical output which can be utilized for the control of the engine operation, such as the engine spark timing, for example. The one surface of the diaphragm is coated with a layer of a hydrophilic material to be disposed in direct contact with the engine cooling water. The coating is advantageously operative to prevent the attachment or adhesion of air bubbles to the water-contacting surface of the diaphragm whereby the sensitivity of the diaphragm to the water pressure pulsation is improved with a resultant improvement in the accuracy of the electrical output of the knocking detection device.

The above and other objects, features and advantages of the invention will be made more apparent by the following description with reference to the accompanying drawings.

DESCRIPTION OF PREFERRED EMBODIMENTS

Figure 1:
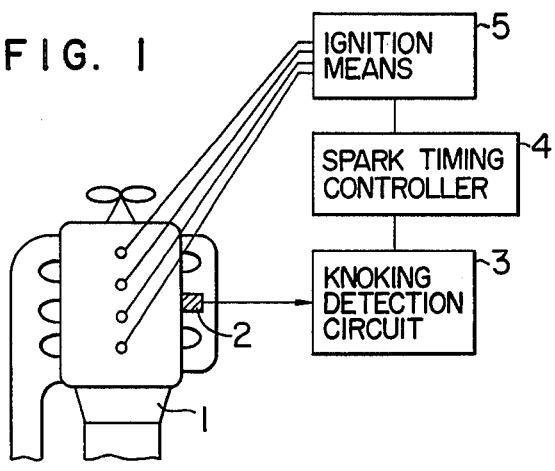
FIG. 1 is a block diagram of a knock feedback type ignition system of an internal combustion engine.
Figure 2:
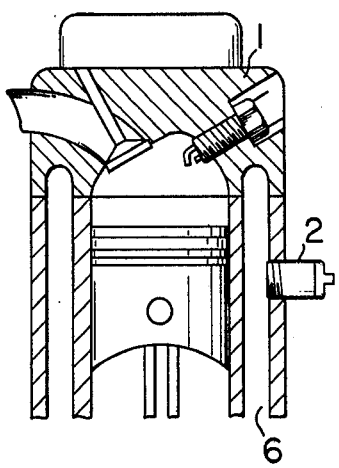
FIG. 2 is a partly sectional view of an internal combustion engine equipped with a knocking detection device according to the present invention.

Referring first to FIGS. 1 and 2, a knocking detection device 2 is mounted on a 4-cylinder-in-line engine 1. More specifically, the knocking detection device 2 is screwed into the wall of a water jacket 6 so that one end of the knocking detection device 2 is directly exposed to the cooling water circulated through the water jacket 6. The knocking detection device 2 is operative to detect engine knocks to emit electrical output signals to a knocking detection circuit 3 which is operative in response to the electrical signals from the knocking detection device 2 to emit electrical output signals to a spark timing controller 4 which is electrically connected to an ignition means 5 of the engine 1 and is operative to advance or retard the spark timing in accordance with the electrical signals from the knocking detection circuit 3 to thereby optimize the spark timing of the engine 1. More specifically, the ignition means 5 is of a conventional structure and is operative to electrically energize spark plugs of the engine to ignite air-fuel mixture charges supplied into engine cylinders. The spark timing is controlled by the electrical output signals of the spark timing controller 4.

Figure 3:
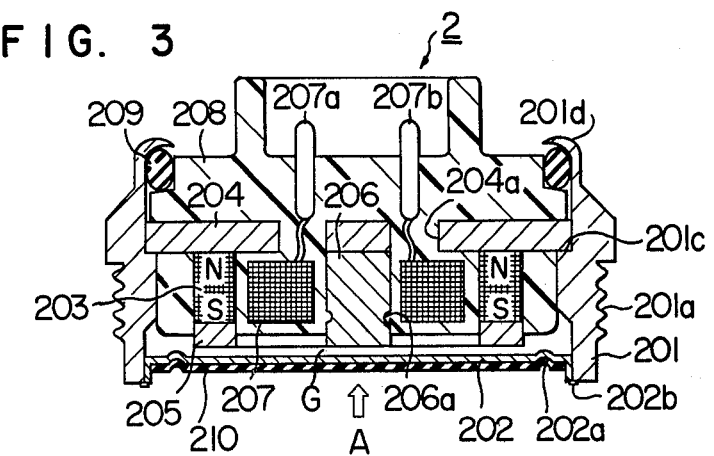
FIG. 3 is an axial sectional view of an embodiment of the knocking detection device of the invention.

Referring now to FIG. 3, the knocking detection device 2 has a housing 201 having an external screw thread 201a by means of which the device is mounted on the engine 1. A disc-shaped diaphragm 202 is secured to the housing 201 by welding the outer peripheral edge of the diaphragm to the housing adjacent to the inner peripheral edge of the bottom of the housing. The diaphragm 202 is provided with an annular protrusion or ridge 202a of a diameter which is so selected that the diaphragm is operative to resonate with a frequency at which the engine knocks take place.

The diaphragm 202 is provided with a coating 210 of a hydrophilic material applied to the outer or water-contacting surface of the diaphragm. The coating 210 preferably comprises a layer of silicon formed or deposited on the diaphragm outer surface by spattering.

The knocking detection device 2 is further provided with a cylindrical ferrite or anunico magnet 203 disposed within the housing 201 axially inwardly of the diaphragm 202 and having a polarity shown in FIG. 3. A disc-shaped magnetic plate 204 has its outer peripheral edge portion in engagement with an annular shoulder 201c on the inner surface of the housing 201 and is formed with communication openings 204a. The magnetic plate 204 is disposed on the side of the magnet 203 remote from the diaphragm 202. An annular magnetic member 205 is disposed in contact with the end of the magnet 203 adjacent to the diaphragm 202. A cylindrical central magnetic yoke 206 is disposed centrally of the magnet 203 and is fixed to the magnetic plate 204 by any conventional securing means such as welding. An annular groove 206a is formed in the outer peripheral surface of the central yoke 206. A coil 207 is disposed between the magnet 203 and the central yoke 206 to detect variations in the magnetic flux caused by the variation in the magnetic resistance of the central magnetic path formed by the central yoke 206. The coil 207 is operative to produce an electrical output which is variable as a function of the variation in the magnetic flux per unit of time. The electric output of the coil 207 is transmitted through output terminals 207a and 207b to the knocking detection circuit 3 shown in FIG. 1.

The magnetic plate 204, magnet 203, magnetic member 205, central yoke 206, coil 207 and output terminals 207a and 207b are all partially or wholly embedded in and secured together by a moulded plastic member 208 to form a unitary structure which is fitted into the housing 201 until the outer peripheral edge portion of the magnetic plate 204 is engaged by the annular shoulder 201c on the inner peripheral surface of the housing 201. An O-ring 209 is disposed between the outer peripheral surface of the moulded plastic member 208 and the inner surface of the housing 201 to provide a seal therebetween. The upper peripheral edge portion 201d of the housing 201 is radially inwardly bent over the O-ring 209 to retain the moulded plastic member 208 and thus the embedded component parts within the housing 201. The lower end faces of the central yoke 206 and of the magnetic member 205 are spaced a distance from the inner or upper surface of the diaphragm 202 to cooperate therewith to define an air gap G. The diaphragm 202 is made from a magnetic material such as iron, magnetic stainless steel or the like. Thus, the deflection or deformation of the diaphragm 202 causes a dimensional change in the air gap G which in turn is operative to vary the magnetic flux passing through the magnetic circuit.

The knocking detection device of the described embodiment of the invention operates as follows:

When a knocking takes place in the engine 1, a pulsation is caused in the cooling water pressure and propagated or transmitted through the cooling water to the diaphragm 202 of the knocking detection device 2, as indicated by an arrow A in FIG. 3. As a result, the diaphragm 202 is vibrated in response to the pulsation of the cooling water pressure. The vibration of the diaphragm in turn causes a dimensional change in the air gap G. Since the resonance characteristic of the diaphragm 202 is selected such that the diaphragm 202 resonates with the pulsation of the cooling water pressure caused by the engine knocking, the amplitude of the vibratory deflection of the diaphragm 202 is increased with a resultant increase in the amplitude of the dimensional change in the air gap G. In consequence, the magnetic flux passing through the magnetic circuit formed by the magnet 203, magnetic member 206, diaphragm 202, center yoke 206 and magnetic plate 204 is changed in magnitude as a function of the dimensional change of the air gap G, so that the coil 207 produces an electrical output in an alternating manner. The electrical output of the coil 207 is delivered through the output terminals 207a and 207b to the knocking detection circuit 3 and is utilized for the spark timing control, as discussed above.

As described above, the water-contacting surface of the diaphragm 202 of the knocking detection device 2 is coated with a layer of a hydrophilic material 210. Thus, the diaphragm 202 is advantageously prevented from being attached or adhered by air bubbles which tend to absorb the puslation of the cooling water pressure. Accordingly, the diaphragm 202 of the described knocking detection device 2 exhibits an improved sensitivity to pulsation of the engine cooling water caused by engine knockings. This advantageously eliminates the prior art problem that the output voltage of the prior art knocking detection device is lowered due to the presence of air bubbles on the water-contacting surface of the diaphragm.

Figure 4:
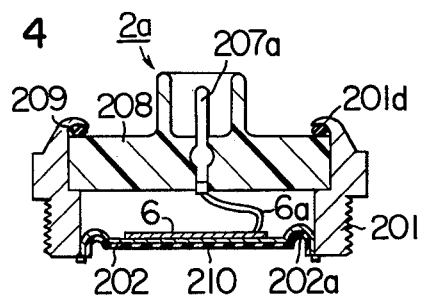
FIG. 4 is an axial sectional view of another embodiment of the knocking detection device of the invention.

FIG. 4 shows a second embodiment 2a of the knocking detection device of the invention. This embodiment is similar to the first embodiment described with reference to FIG. 3 in that a hydrophilic material layer 210 is provided on the water-contacting surface of a diaphragm 202. Parts of the second embodiment 2a similar to those of the first embodiment 2 are designated by the same reference numerals. The second embodiment 2a is distinguished from the first embodiment 2 in the following points: The diaphragm 202 is made of an electrically conductive material and adapted to be grounded through the housing 201. A piezoelectric element 6 is secured to the inner or upper surface of the diaphragm 202 preferably by means of an electrically conductive adhesive. The piezoelectric element 6 may alternatively be moulded or cast on the diaphragm 202 by spattering a piezoelectric material. A thin electrode film (not shown) is secured to the surface of the piezoelectric element 6 remote from the diaphragm 202 and electrically connected by a lead line 6a to the output terminal 207a.

In this knocking detection device 2a, the pulsation of the engine cooling water pressure caused by a knocking taking place in the engine 1 is exerted to the diaphragm 202 to cause a vibratory deflection thereof which in turn applies a stress to the piezoelectric element 6 so that an electrical signal is produced therein and transmitted through the lead line 6a and the output terminal 207a to the knocking detection circuit 3 shown in FIG. 1 and is utilized for the control of the engine spark timing.

The improved feature of the invention, which comprises the hydrophilic material layer 210 provided on the water-contacting surface of the diaphrgm 202, can be applied not only to the knocking detection devices of the construction described above with reference to FIGS. 3 and 4 but also to any other knocking detection devices which are so constructed as to detect engine knockings by detecting only the pulsations of the engine cooling water pressure caused by the engine knockings.

As described above, the knocking detection device according to the present invention includes a layer of hydrophilic material 210 provided on the water-contacting surface of the diaphragm 202 which is responsive directly to the pulsations of the engine cooling water pressure caused by engine knockings. Accordingly, the diaphragm 202 is advantageously prevented from the attachment or adhesion of air bubbles which at least partly absorb the pulsations of the cooling water pressure and adversely affect the precision of the electrical output of the knocking detection device.

What is claimed is:

1. A knocking detection device for an internal combustion engine, comprising a diaphragm having one surface adapted to be faced to the engine cooling water and being operative to vibrate in response to pulsation of the pressure of said engine cooling water caused by an engine knocking, and means responsive to the vibration of said diaphragm to produce an electrical output, wherein said one surface of said diaphragm is coated with a layer of a hydrophilic material to be disposed in direct contact with said engine cooling water.

2. A knocking detection device as claimed in claim 1, wherein said hydrophilic material is silicon.

3. A knocking detection device as claimed in claim 1 or 2, wherein said vibration responsive means comprises means for generating a magnetic flux, means for forming a magnetic circuit, said magnetic circuit forming means including said diaphragm, and means for detecting changes in the magnitude of said magnetic flux caused by the vibration of said diaphragm.

4. A knocking detection device as claimed in claim 1 or 2, wherein said vibration responsive means comprises a piezoelectric element secured to said diaphragm.

* * * * *

UNITED STATES PATENT AND TRADEMARK OFFICE
CERTIFICATE OF CORRECTION

PATENT NO. : 4,440,014
DATED      : April 3, 1984
INVENTOR(S): Tadashi HATTORI et al It is certified that error appears in the above-identified patent and that said Letters Patent is hereby corrected as shown below:

On the Title Page:

Please add to Item ]30] the following omitted

Foreign Application Priority Data:

--September 16, 1981 [JP]   Japan.....138071--

Signed and Sealed this

Twenty-sixth Day of March 1985

[SEAL]

Attest:

DONALD J. QUIGG

Attesting Officer    Acting Commissioner of Patents and Trademarks